US011520993B2

(12) United States Patent
Chen et al.

(10) Patent No.: US 11,520,993 B2
(45) Date of Patent: Dec. 6, 2022

(54) WORD-OVERLAP-BASED CLUSTERING CROSS-MODAL RETRIEVAL

(71) Applicants: NEC Laboratories America, Inc., Princeton, NJ (US); NEC Corporation, Tokyo (JP)

(72) Inventors: Yuncong Chen, Plainsboro, NJ (US); Hao Yuan, College Station, TX (US); Dongjin Song, Princeton, NJ (US); Cristian Lumezanu, Princeton Junction, NJ (US); Haifeng Chen, West Windsor, NJ (US); Takehiko Mizoguchi, Tokyo (JP)

(73) Assignee: NEC Corporation

( * ) Notice: Subject to any disclaimer, the term of this patent is extended or adjusted under 35 U.S.C. 154(b) by 350 days.

(21) Appl. No.: 16/918,353

(22) Filed: Jul. 1, 2020

(65) Prior Publication Data

US 2021/0027019 A1   Jan. 28, 2021

Related U.S. Application Data

(60) Provisional application No. 62/878,781, filed on Jul. 26, 2019, provisional application No. 62/877,952, filed on Jul. 24, 2019.

(51) Int. Cl.
*G06N 3/08* (2006.01)
*G06F 16/00* (2019.01)
(Continued)

(52) U.S. Cl.
CPC ............ *G06F 40/30* (2020.01); *G06F 17/16* (2013.01); *G06K 9/6215* (2013.01); *G06K 9/6218* (2013.01); *G06N 3/088* (2013.01)

(58) Field of Classification Search
USPC ............ 382/155–159; 704/4–275; 706/1–45, 706/934
See application file for complete search history.

(56) References Cited

U.S. PATENT DOCUMENTS 10,339,421 B2 * 7/2019 Mei .......................... G06N 3/08
10,956,787 B2 * 3/2021 Rothberg ............... G16H 50/70
(Continued)

OTHER PUBLICATIONS

Galen, et al. "Deep Canonical Correlation Analysis", Proceedings of the 30th International Conference on Machine Learning, Jun. 2013, 9 pages.

(Continued)

*Primary Examiner* — Marcellus J Augustin
(74) *Attorney, Agent, or Firm* — Joseph Kolodka

(57) ABSTRACT

A system for cross-modal data retrieval is provided that includes a neural network having a time series encoder and text encoder which are jointly trained using an unsupervised training method which is based on a loss function. The loss function jointly evaluates a similarity of feature vectors of training sets of two different modalities of time series and free-form text comments and a compatibility of the time series and the free-form text comments with a word-overlap-based spectral clustering method configured to compute pseudo labels for the unsupervised training method. The computer processing system further includes a database for storing the training sets with feature vectors extracted from encodings of the training sets. The encodings are obtained by encoding a training set of the time series using the time series encoder and encoding a training set of the free-form text comments using the text encoder.

20 Claims, 12 Drawing Sheets

(51) Int. Cl.
    *G06F 16/33*     (2019.01)
    *G06F 17/00*     (2019.01)
    *G06F 40/10*     (2020.01)
    *G06F 40/20*     (2020.01)
    *G06F 40/211*     (2020.01)
    *G06F 40/40*     (2020.01)
    *G06F 40/30*     (2020.01)
    *G06F 17/16*     (2006.01)
    *G06K 9/62*     (2022.01)

(56) References Cited

U.S. PATENT DOCUMENTS

2017/0161372 A1\*   6/2017   Fernández  ............ G06F 40/211
2019/0197097 A1\*   6/2019   Nagarajan  ............. G06F 40/205

OTHER PUBLICATIONS

Hardoon, et al., "Canonical Correlation Analysis: An Overview with Application to Learning Methods", Neural Computation, Dec. 2004, pp. 2639-2664, vol. 16, Issue 12.
Rasiwasia, et al. "A New Approach to Cross-Modal Multimedia Retrieval", Proceedings of the 18th ACM International Conference on Multimedia, Oct. 2010, pp. 251-260.
Schroff, et al., "FaceNet: A Unified Embedding for Face Recognition and Clustering", Proceedings of the IEEE Conference on Computer Vision and Pattern Recognition, Jun. 2015, pp. 815-823.
Shi, et al., "Normalized Cuts and Image Segmentation", IEEE Transactions on Pattern Analysis and Machine Intelligence, Aug. 2000, pp. 888-905, vol. 22, No. 8.
Vaswani, et al., "Attention is All You Need", 31st Conference on Neural Information Processing Systems (NIPS 2017), Dec. 2017, pp. 1-11.

\* cited by examiner

WORD-OVERLAP-BASED CLUSTERING CROSS-MODAL RETRIEVAL

RELATED APPLICATION INFORMATION

This application claims priority to U.S. Provisional Patent Application Ser. No. 62/878,781, filed on Jul. 26, 2019, incorporated herein by reference in its entirety. This application also claims priority to U.S. Provisional Patent Application Ser. No. 62/877,952, filed on Jul. 24, 2019, incorporated herein by reference in its entirety.

BACKGROUND

Technical Field

The present invention relates to information processing and more particularly to unsupervised cross-modal retrieval in datasets of time series data and text data using word-overlap-based clustering.

DESCRIPTION OF THE RELATED ART

Time series (TS) data are prevalent in the big-data era. One example is industrial monitoring where readings of a large number of sensors form complex time series. Modern data analytics software use machine learning to detect patterns from time series. However, current analytics software is not very friendly to human users. For example, the following problems are very common.

First, while machine learning systems can perform specific classification tasks, the results are usually returned without explanations. Users want machine analysis results presented in a more elaborate and natural way.

Second, with the ever increasing volume of time series data, automated search over historical data becomes necessary. Traditionally, example segments are used as search queries. However, there is often a need to use more descriptive queries. Database query languages such as SQL may express more complex criteria but is not comprehensible for average users.

SUMMARY

According to aspects of the present invention, a computer processing system for cross-modal data retrieval is provided. The computer processing system includes a neural network having a time series encoder and text encoder which are jointly trained using an unsupervised training method which is based on a loss function. The loss function jointly evaluates a similarity of feature vectors of training sets of two different modalities of time series and free-form text comments and a compatibility of the time series and the free-form text comments with a word-overlap-based spectral clustering method configured to compute pseudo labels for the unsupervised training method. The computer processing system further includes a database for storing the training sets with feature vectors extracted from encodings of the training sets. The encodings are obtained by encoding a training set of the time series using the time series encoder and encoding a training set of the free-form text comments using the text encoder. The computer processing system also includes a hardware processor for retrieving the feature vectors corresponding to at least one of the two different modalities from the database for insertion into a feature space together with at least one feature vector corresponding to a testing input relating to at least one of a testing time series and a testing free-form text comment, determining a set of nearest neighbors from among the feature vectors in the feature space based on distance criteria, and outputting testing results for the testing input based on the set of nearest neighbors.

According to other aspects of the present invention, a computer-implemented method for cross-modal data retrieval is provided. The method includes jointly training a neural network having a time series encoder and text encoder using an unsupervised training method which is based on a loss function. The loss function jointly evaluates a similarity of feature vectors of training sets of two different modalities of time series and free-form text comments and a compatibility of the time series and the free-form text comments with a word-overlap-based spectral clustering method configured to compute pseudo labels for the unsupervised training method. The method further includes storing, in a database, the training sets with feature vectors extracted from encodings of the training sets. The encodings are obtained by encoding a training set of the time series using the time series encoder and encoding a training set of the free-form text comments using the text encoder. The method also includes retrieving the feature vectors corresponding to at least one of the two different modalities from the database for insertion into a feature space together with at least one feature vector corresponding to a testing input relating to at least one of a testing time series and a testing free-form text comment. The method additionally includes determining a set of nearest neighbors from among the feature vectors in the feature space based on distance criteria, and outputting testing results for the testing input based on the set of nearest neighbors.

According to yet further aspects of the present invention, a computer program product for cross-modal data retrieval is provided. The computer program product includes a non-transitory computer readable storage medium having program instructions embodied therewith. The program instructions are executable by a computer to cause the computer to perform a method. The method includes jointly training a neural network having a time series encoder and text encoder using an unsupervised training method which is based on a loss function. The loss function jointly evaluates a similarity of feature vectors of training sets of two different modalities of time series and free-form text comments and a compatibility of the time series and the free-form text comments with a word-overlap-based spectral clustering method configured to compute pseudo labels for the unsupervised training method. The method also includes storing, in a database, the training sets with feature vectors extracted from encodings of the training sets. The encodings are obtained by encoding a training set of the time series using the time series encoder and encoding a training set of the free-form text comments using the text encoder. The method additionally includes retrieving the feature vectors corresponding to at least one of the two different modalities from the database for insertion into a feature space together with at least one feature vector corresponding to a testing input relating to at least one of a testing time series and a testing free-form text comment. The method further includes determining a set of nearest neighbors from among the feature vectors in the feature space based on distance criteria, and outputting testing results for the testing input based on the set of nearest neighbors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for unsupervised cross-modal retrieval in datasets of time series data and text data using word-overlap-based clustering.

In many real-world scenarios, time series are tagged with text comments written by domain experts. For example, when a power plant operator notices a sensor failure, he may write notes describing the signal shape, causes, solutions and expected future state. Such data involves paired examples of two modalities (multivariate time series and text). Facilities may have accumulated large amounts of such multi-modal data over the course of its operation. They can be used to learn correlation between time series data and human explanations. They are also good resource to learn knowledge of specific application domains. Given that these data include rich expertise knowledge, the present invention exploits the same for a variety of different applications.

One or more embodiments of the present invention use word overlap between two texts to measure example similarity with respect to a similarity matric. Based on the similarity matrix, a clustering of the examples is computed using spectral clustering. The cluster assignment is used as pseudo-labels. One or more embodiments of the present invention use neural networks to encode time series segments and text notes in vector representations. A composite loss function is defined over the vector representations based on example pseudo-labels. Training of the neural networks is realized by minimizing this loss function.

Meanwhile, one or more embodiments of the present invention identify phrases that frequently appear in texts assigned to the same clusters. The phrases can be used to discover common concepts in the given dataset. For example, from power plant operation logs, the present invention can extract key phrases representing common problems such as "low temperature", "turbine vibration", and so forth.

Figure 1:
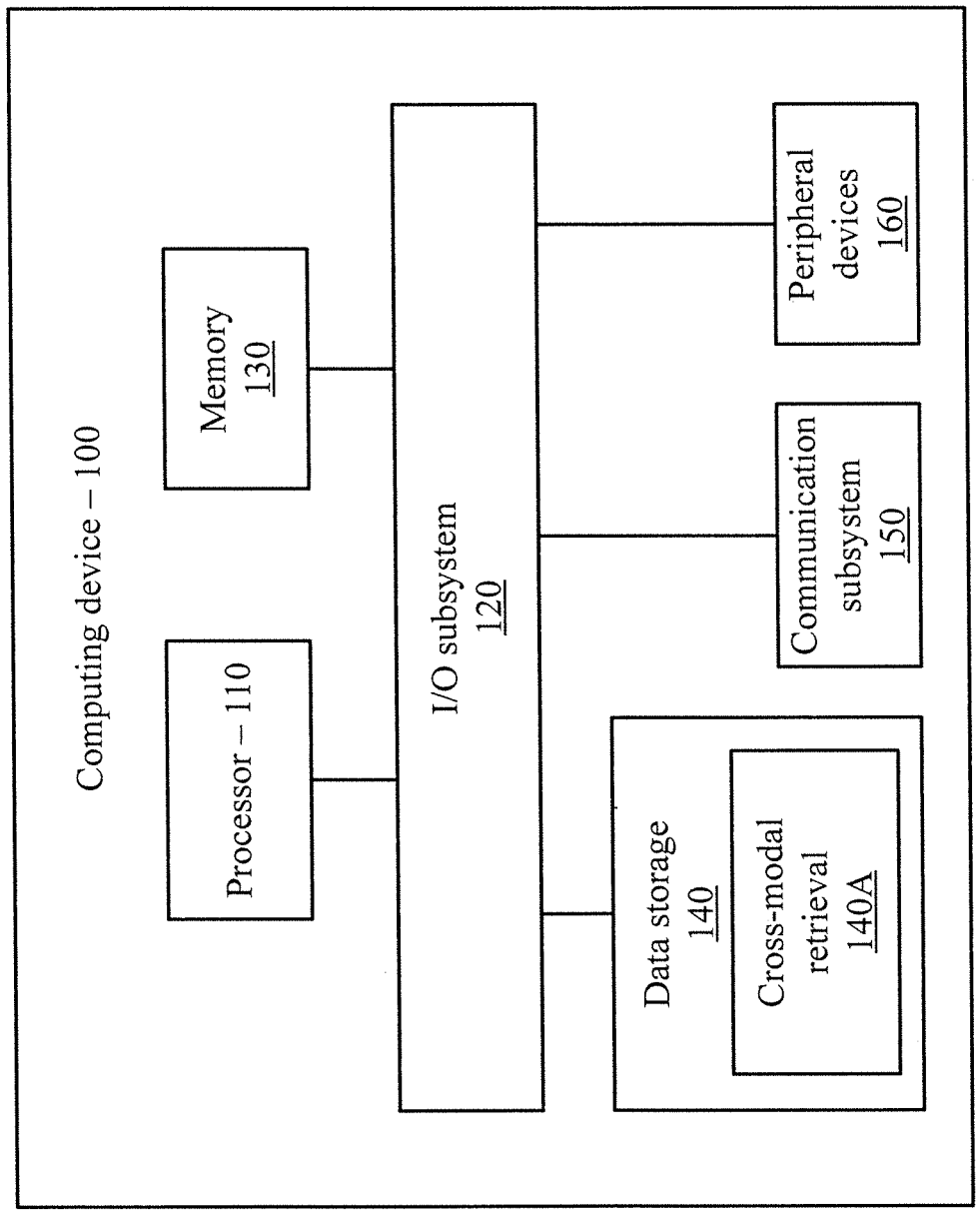
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform unsupervised cross-modal retrieval in datasets of time-series data and text data using word-overlap-based clustering.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code 140A for cross-modal retrieval in datasets of time series data and text data using word-overlap-based clustering. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
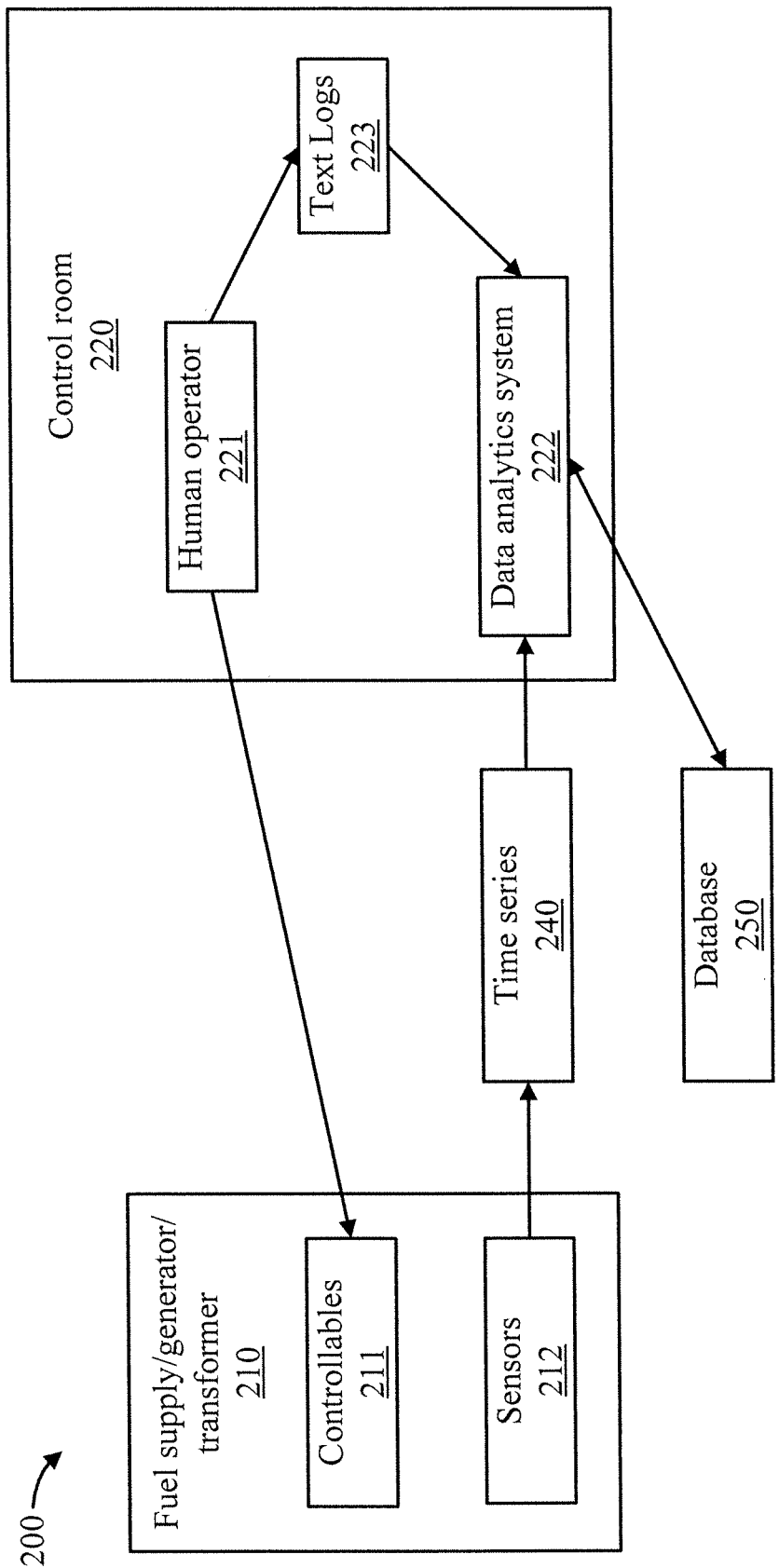
FIG. 2 is a block diagram showing an exemplary power plant scenario, in accordance with an embodiment of the present invention.

FIG. 2 is a block diagram showing an exemplary power plant scenario 200, in accordance with an embodiment of the present invention.

The power plant scenario 200 involves a fuel supply/generator/transformer 210 and a control room 220.

The fuel supply/generator/transformer 210 includes controllables 211 and sensors 212.

The control room 220 includes a human operator(s) 221, a data analytics system 222, and text logs 223.

Thus, in the context of power plant operation, sensors 212 deployed at various parts of the facility collect time series (TS) data 240 that characterize the status of the power generation process. TS data are transmitted to the data analytics system 222 installed in a computer in the control room 220. One or more human operators 221 examine the data on a monitor and may create notes in free-form text. If the data are abnormal, the notes are expected to include details such as cause analysis and resolution. The text notes and the time series data are stored in a database 250 and are used to train the cross-modal retrieval system described herein which is a part of the data analytics system 222.

The human operator 221 may interact with the cross-modal retrieval system in a couple of ways as explained below.

One or more embodiments of the present invention provide a method for unsupervised neural network training and also a method for using a cross-modal retrieval for time series data and text data. Given a database that includes paired data of these two modalities, the trained system can retrieve data that are similar to a user-given query from the database. Depending on the modality of the query and retrieved results, the system has three exemplary usages as follows: (1) explaining time series in natural language; (2) searching historical time series with text description; and (3) searching historical time series with reference series and text description. Of course, other exemplary uses are readily contemplated by one of ordinary skill in the art given the teachings of the present invention provided herein.

Figure 3:
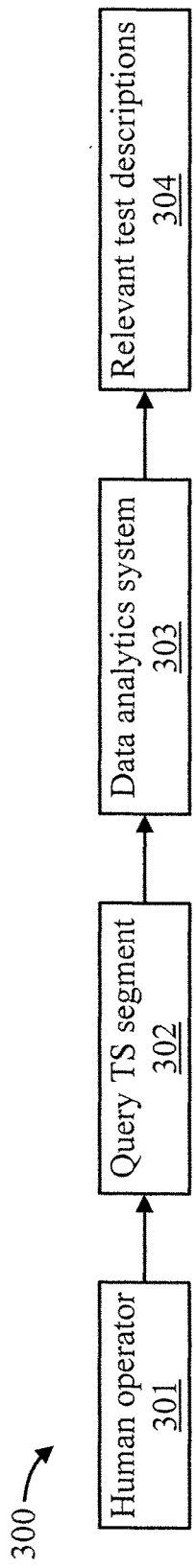
FIG. 3 is a high-level block diagram showing an exemplary system/method for explaining time series in natural language, in accordance with an embodiment of the present invention.

FIG. 3 is a high-level block diagram showing an exemplary system/method 300 for explaining time series in natural language, in accordance with an embodiment of the present invention.

Figure 4:
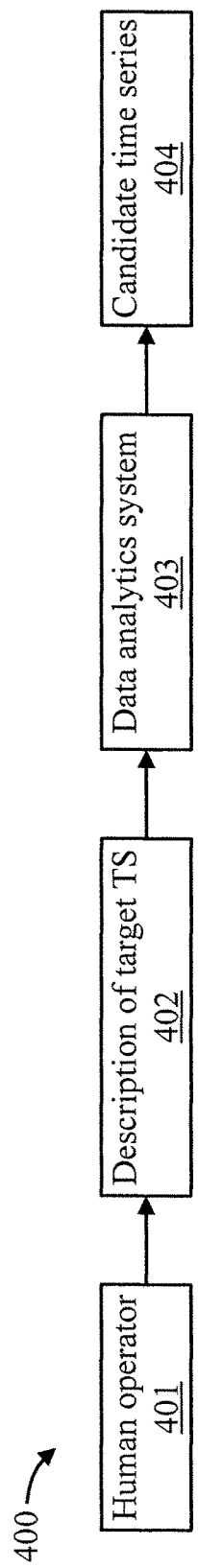
FIG. 4 is a high-level block diagram showing an exemplary system/method for searching historical time series with text descriptions, in accordance with an embodiment of the present invention.

FIG. 4 is a high-level block diagram showing an exemplary system/method 400 for searching historical time series with text descriptions, in accordance with an embodiment of the present invention.

Figure 5:
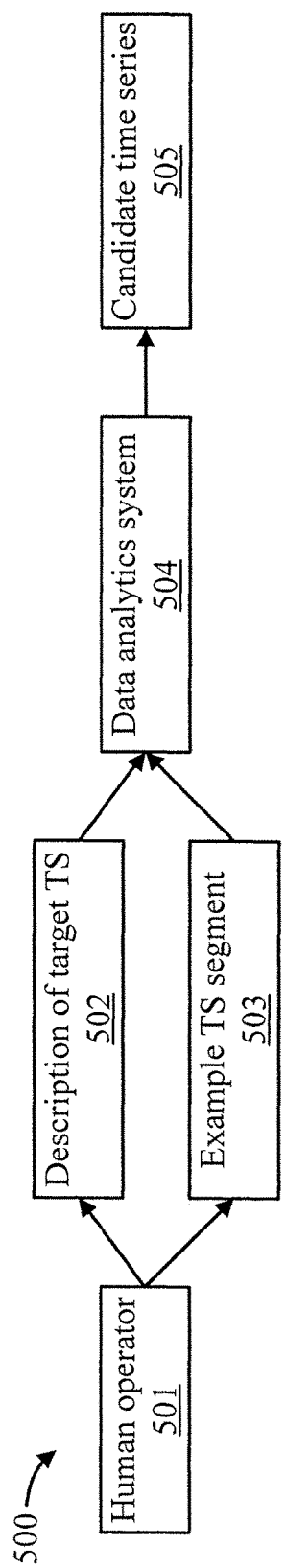
FIG. 5 is a high-level block diagram showing an exemplary system/method for searching historical time series with example series and text description, in accordance with an embodiment of the present invention.

FIG. 5 is a high-level block diagram showing an exemplary system/method 500 for searching historical time series with example series and text description, in accordance with an embodiment of the present invention.

Referring to FIG. 3, the system/method 300 includes an operator 301, a query timeseries (TS) segment 302, a data analytics system 303, and relevant text descriptions 304. Given a time series segment 302, retrieve relevant comment texts 304 that can serve as explanations of the query segment 302 using the data analytics system 303.

Referring to FIG. 4, the system/method 400 includes an operator 401, a description of a target time series (TS) 402, a data analytics system 403, and candidate time series 404. Given a text description (a natural language sentence or a set of keywords) 402, retrieve time series segments 404 that match the description using the data analytics system 403.

Referring to FIG. 5, the system/method 500 includes an operator 501, a description of a target time series (TS) 502, an example time series segment 503, a data analytics system 504, and candidate time series 505. Given a time series segment 503 and a text description 502, retrieve historical segments that match the description 502 and also resemble the query segment 503 using the data analytics system 504.

Figure 6:
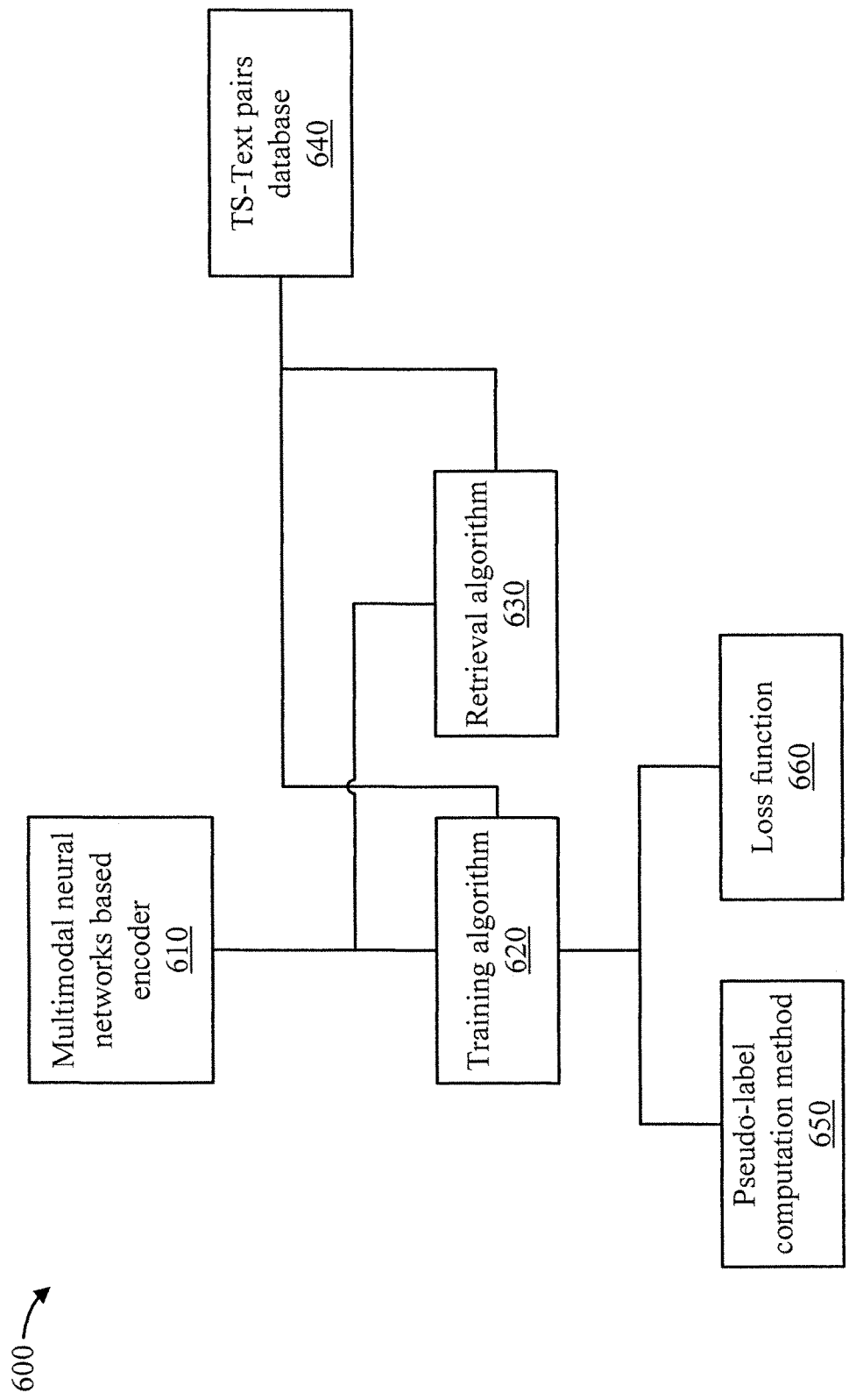
FIG. 6 is a high level block diagram showing an exemplary cross-modal retrieval system/method, in accordance with an embodiment of the present invention.

FIG. 6 is a high level block diagram showing an exemplary cross-modal retrieval system/method 600, in accordance with an embodiment of the present invention.

The system/method 600 includes a multimodal neural networks based encoder 610, a training algorithm 620, a retrieval algorithm 630, a time series (TS) and text pairs database 640, a pseudo-label computation method 650, and a loss function 660.

The cross-modal retrieval system/method 600 uses multimodal neural networks 610 to encode texts and time series data into vector representations. The neural networks 610 are trained by the training algorithm 630 using examples in the user-provided database of TS-text pairs 640. The training algorithm 620 entails a special pseudo-label computation method 650 and a special loss function 660. Training is unsupervised, meaning that it does not require human involvement in this process. After the neural network encoder 610 is trained, the retrieval of data from the database according to a user-provided query is realized in accordance with the retrieval algorithm 630.

Figure 7:
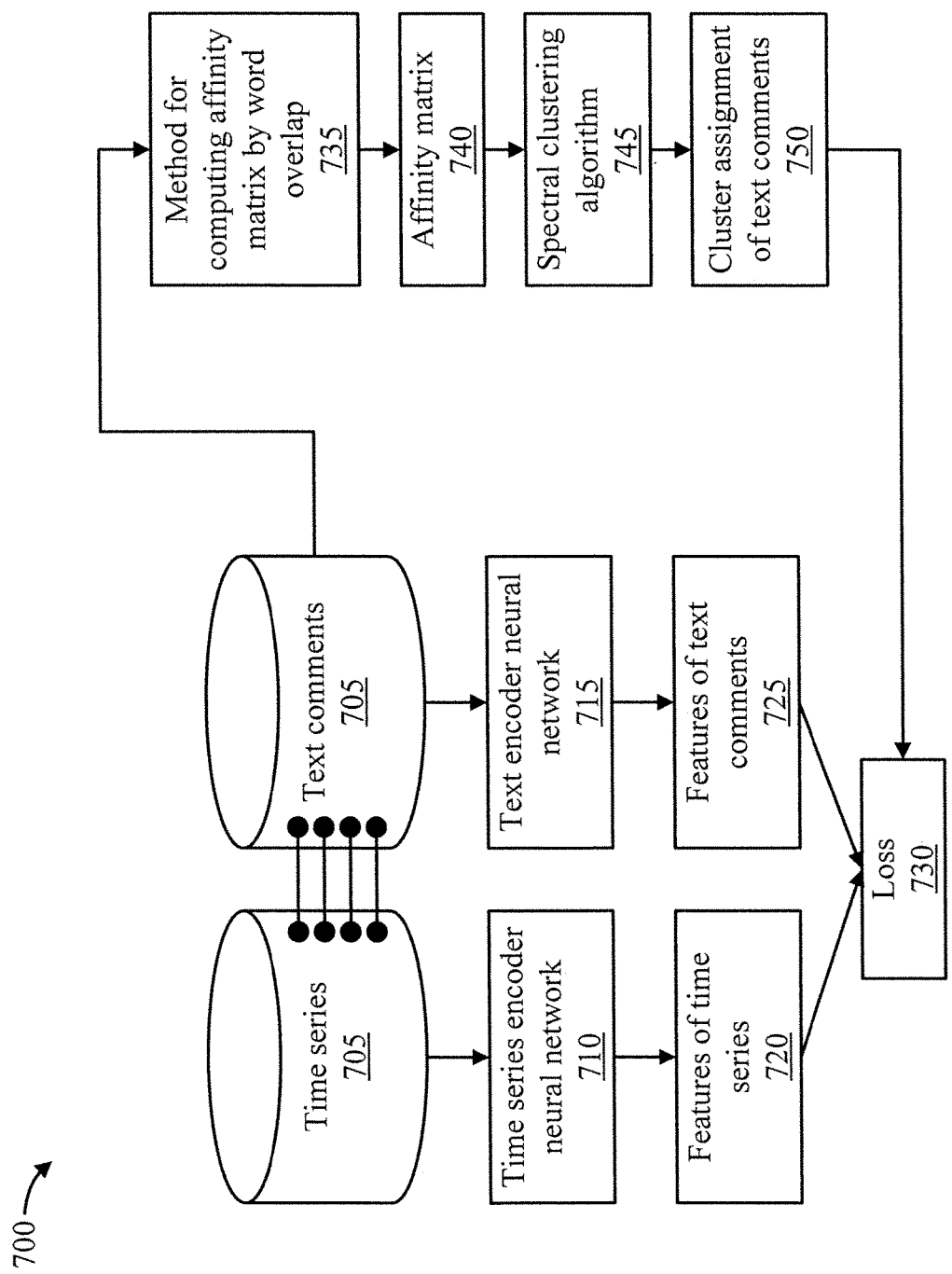
FIG. 7 is a high level block diagram showing an exemplary training architecture 700, in accordance with an embodiment of the present invention.

FIG. 7 is a high level block diagram showing an exemplary training architecture 700, in accordance with an embodiment of the present invention.

The training architecture 700 includes a database system 705, a time series encoder neural network 710, a text encoder neural network 715, features of the time series 720, features of the text comments 725, a loss function 730, a method 735 for computing an affinity matrix by word overlap, an affinity matrix 740, a spectral clustering algorithm 745, and a cluster assignment 750 of text comments.

Figure 8:
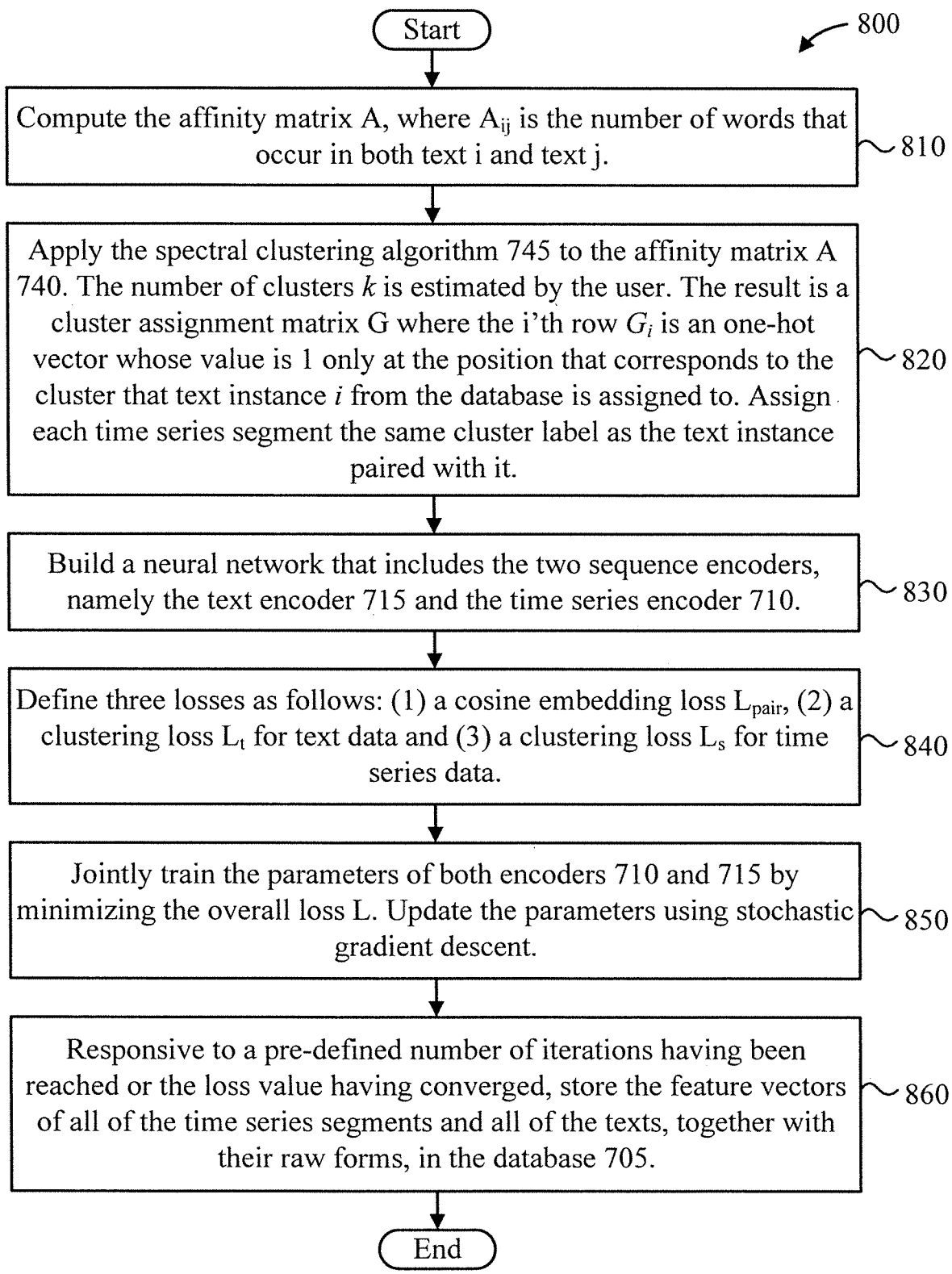
FIG. 8 is a flow diagram showing an exemplary training method, in accordance with an embodiment of the present invention.

FIG. 8 is a flow diagram showing an exemplary training method 800, in accordance with an embodiment of the present invention.

At block 810, compute the affinity matrix A 740, where $A_{ij}$ is the number of words that occur in both text i and text j.

Suppose $s_i$ (resp. $s_j$) is the set of words in sentence i (resp. j), $A_{ij}$ can be computed as the intersection of the two sets as follows:

$$A_{ij}=|s_i \cap s_j|.$$

At block 820, apply the spectral clustering algorithm 745 to the affinity matrix A 740. The number of clusters k is estimated by the user. The result is a cluster assignment matrix G where the i'th row $G_i$ is an one-hot vector whose value is 1 only at the position that corresponds to the cluster that text instance i from the database is assigned to. Assign each time series segment the same cluster label as the text instance paired with it. These clusters form the set of concepts provided by various embodiments of the present invention.

In further detail, in spectral clustering, the degree matrix D is first computed. The degree matrix D is a diagonal matrix where the i-th diagonal element is $D_{ii}=\Sigma_j A_{ij}$. The Laplacian matrix L=D−A is computed. The singular value decomposition of L is computed as $U\Sigma V^T$=L, where the i-th row of U is the spectral embedding of the i-th training example. The spectral embeddings of all training examples are clustered using a standard clustering method such as k-means. The result is that each example is assigned to one of the k clusters.

At block 830, build a neural network that includes the two sequence encoders, namely the text encoder 715 and the time series encoder 710. The text encoder 715, denoted by g', takes the tokenized text comments as input. The time-series encoder 710, denoted by g', takes the time series as input. The architecture of the text encoder is FIG. 9. The time-series encoder has almost the same architecture as text encoder, except that the word embedding layer is replaced with a fully connected layer as shown in FIG. 10. The encoder architecture includes a series of convolution layers followed by a transformer network. The convolution layers capture local contexts (e.g. phrases for text data). The transformer encodes the longer term dependencies in the sequence.

At block 840, define three losses as follows: (1) a cosine embedding loss $L_{pair}$, (2) a clustering loss $L_t$ for text data and (3) a clustering loss $L_s$ for time series data.

$L_{pair}$, which measures the similarity between the feature vectors of the time series segment and the text that belongs to a same pair, is calculated as follows:

$$L_{pair} = \cos(u_i, v_i) = \frac{u_i^T v_i}{\sqrt{\|u_i\|}\sqrt{\|v_i\|}}$$

Here $u_i$ and $v_i$ are the feature vector of the i'th time series segment and that of the i'th text, respectively. In other words, $u_i=g^{srs}(x_i)$ and $v_i=g^{txt}(y_i)$ where $x_i$ is the i'th time series segment, $y_i$ is the i'th text.

$L_s$ (resp. $L_t$) measures the consistency between the pairwise affinity values between time series (resp. text) instances computed from the feature vectors using a Gaussian kernel and the affinity values computed from the spectral clustering in block 810. $L_s$ is defined as follows:

$$L_s = \sum_{ij} G_i^T G_j \log k(u_i, u_j)$$

Here K is a Gaussian kernel defined as:

$$K(x, y) = \exp\left(-\frac{\|x-y\|^2}{\sigma^2}\right)$$

with σ chosen by the user.

$L_t$ is defined identically to $L_s$ except v is used instead of u.

Finally, the overall loss L is defined as the sum of the three losses. $L = L_{pair} + L_s + L_t$.

At block 850, jointly train the parameters of both encoders 710 and 715 by minimizing the overall loss L. More concretely, the training proceeds in iterations. At each iteration, a fixed-size batch of data pairs are sampled. The overall loss for the batch and the gradient of the loss with respect to the parameters of both encoders 710 and 715 are computed. Update the parameters using stochastic gradient descent.

At block 860, responsive to a pre-defined number of iterations having been reached or the loss value having converged, store the feature vectors of all of the time series segments and all of the texts, together with their raw forms, in the database 705.

Figure 9:
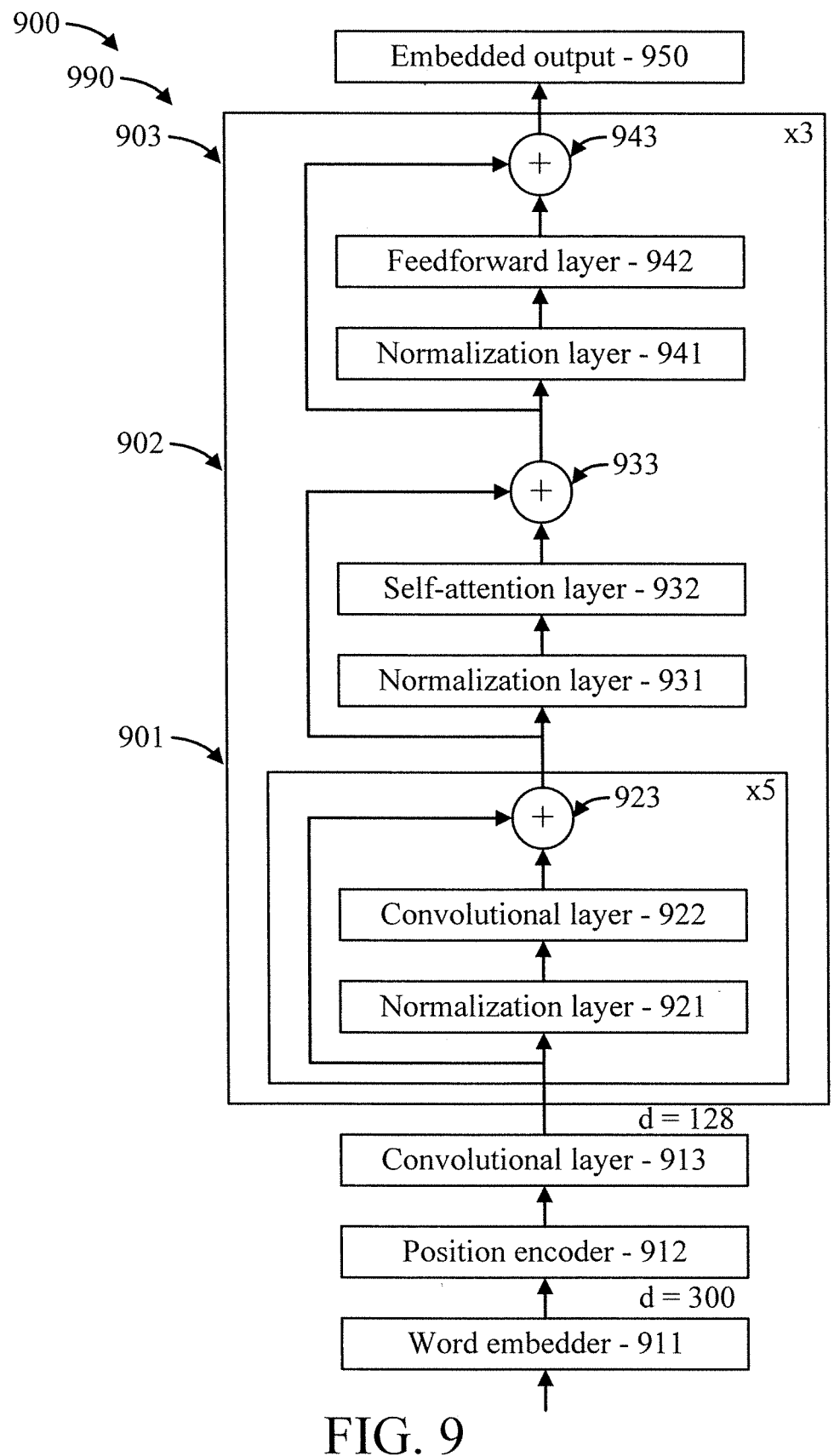
FIG. 9 is a block diagram showing an exemplary architecture of the text encoder 715 of FIG. 7, in accordance with an embodiment of the present invention.
Figure 10:
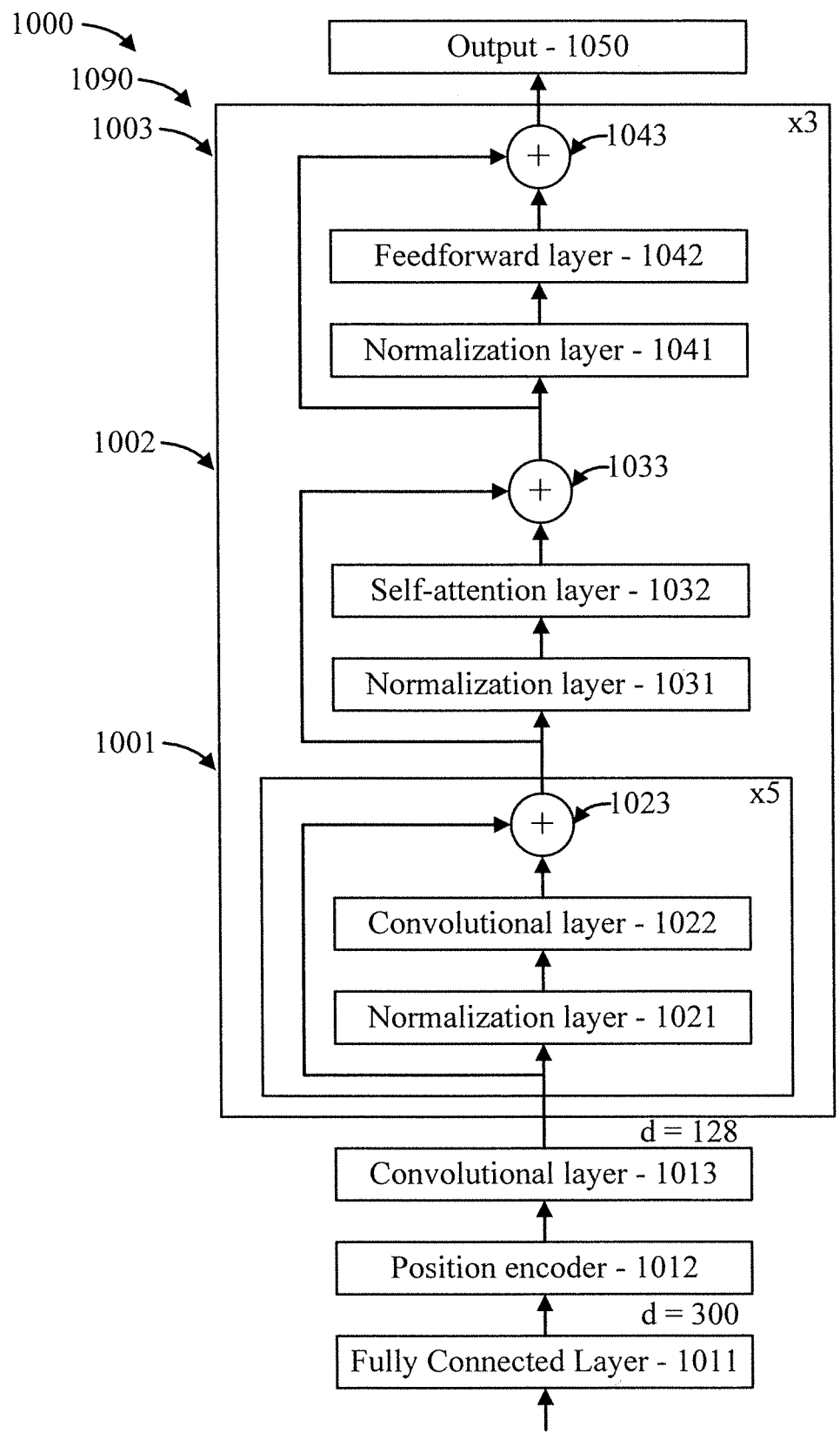
FIG. 10 is a block diagram showing an exemplary architecture of the time series encoder 710 of FIG. 7, in accordance with an embodiment of the present invention.

FIG. 9 is a block diagram showing an exemplary architecture 900 of the text encoder 715 of FIG. 7, in accordance with an embodiment of the present invention.

The architecture 900 includes a word embedder 911, a position encoder 912, a convolutional layer 913, a normalization layer 921, a convolutional layer 922, a skip connection 923, a normalization layer 931, a self-attention layer 932, a skip connection 933, a normalization layer 941, a feedforward layer 942, and a skip connection 943. The architecture 900 provides an embedded output 950.

The above elements form a transformation network 990.

The input is a text passage. Each token of the input is transformed into word vectors by the word embedding layer 911. The position encoder 912 then appends each token's position embedding vector to the token's word vector. The resulting embedding vector is feed to an initial convolution layer 913, followed by a series of residual convolution blocks 901 (with one shown for the sakes of illustration and brevity). Each residual convolution block 901 includes a batch-normalization layer 921 and a convolution layer 922, and a skip connection 923. Next is a residual self-attention block 902. The residual self-attention block 902 includes a batch-normalization layer 931 and a self-attention layer 932 and a skip connection 933. Next is a residual feedforward block 903. The residual feedforward block 903 includes a batch-normalization layer 941, a fully connected linear feedforward layer 942, and a skip connection 943. The output vector 950 from this block is the output of the entire transformation network and is the feature vector for the input text.

This particular architecture 900 is just one of many possible neural network architectures that can fulfill the purpose of encoding text messages to vectors. Besides the particular implementation above, the text encoder can be implemented using many variants of recursive neural networks or 1-dimensional convolutional neural networks. These and other architecture variations are readily contemplated by one of ordinary skill in the art, given the teachings of the present invention provided herein.

FIG. 10 is a block diagram showing an exemplary architecture 1000 of the time series encoder 710 of FIG. 7, in accordance with an embodiment of the present invention.

The architecture 1000 includes a word embedder 1011, a position encoder 1012, a convolutional layer 1013, a normalization layer 1021, a convolutional layer 1022, a skip connection 1023, a normalization layer 1031, a self-attention layer 1032, a skip connection 1033, a normalization layer 1041, a feedforward layer 1042, and a skip connection 1043. The architecture provides an output 1050.

The above elements form a transformation network 1090.

The input is a time series of fixed length. The data vector at each time point is transformed by a fully connected layer to a high dimensional latent vector. The position encoder then appends a position vector to each timepoint's latent vector. The resulting embedding vector is feed to an initial convolution layer 1013, followed by a series of residual convolution blocks 1001 (with one shown for the sakes of illustration and brevity). Each residual convolution block 1001 includes a batch-normalization layer 1021 and a convolution layer 1022, and a skip connection 1023. Next is a residual self-attention block 1002. The residual self-attention block 1002 includes a batch-normalization layer 1031 and a self-attention layer 1032 and a skip connection 1033. Next is a residual feedforward block 1003. The residual feedforward block 1003 includes a batch-normalization layer 1041, a fully connected linear feedforward layer 1042, and a skip connection 1043. The output vector 1050 from this block is the output of the entire transformation network and is the feature vector for the input time series.

This particular architecture 1000 is just one of many possible neural network architectures that can fulfill the purpose of encoding time series to vectors. Besides the time-series encoder can be implemented using many variants of recursive neural networks or temporal dilational convolution neural networks.

Figure 11:
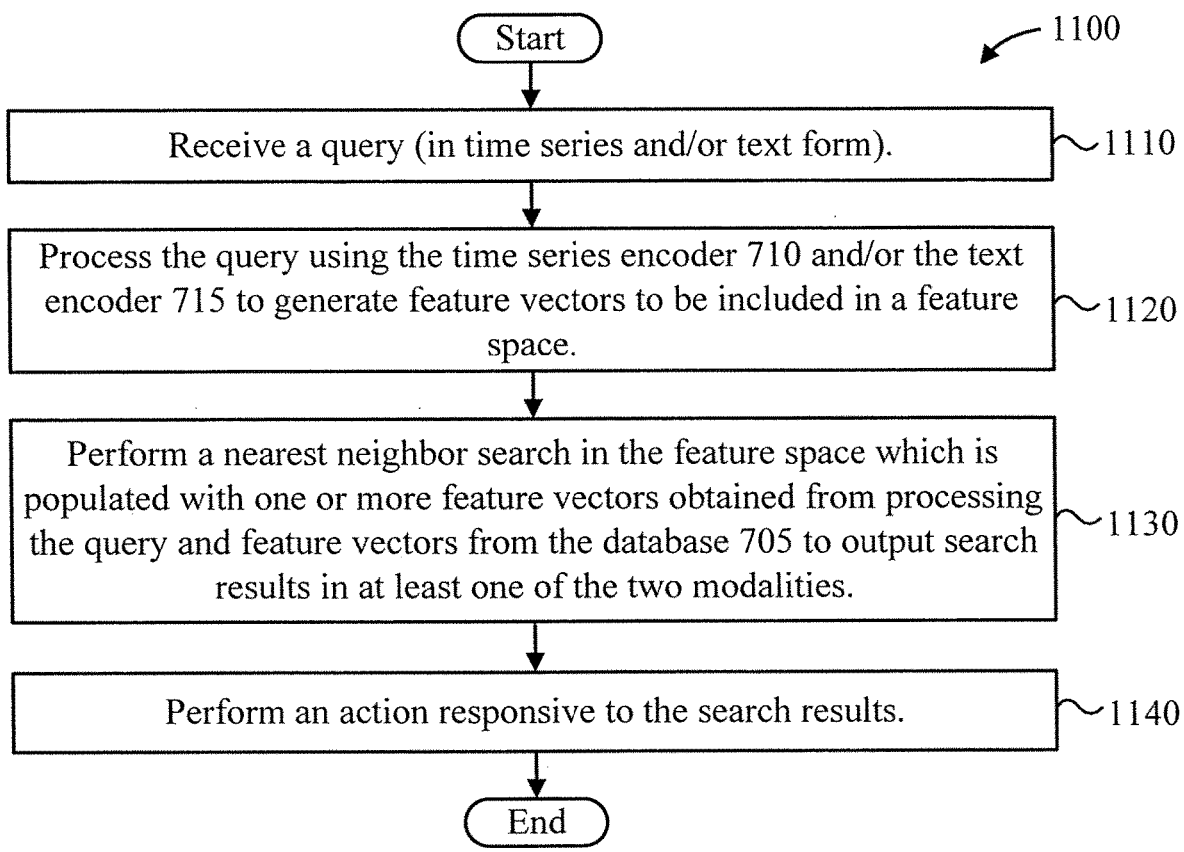
FIG. 11 is a flow diagram showing an exemplary method for cross-modal retrieval, in accordance with an embodiment of the present invention.

FIG. 11 is a flow diagram showing an exemplary method 1100 for cross-modal retrieval, in accordance with an embodiment of the present invention.

At block 1110, receive a query in time series and/or text form.

At block 1120, process the query using the time series encoder 710 and/or the text encoder 715 to generate feature vectors to be included in a feature space.

At block 1130, perform a nearest neighbor search in the feature space which is populated with one or more feature vectors obtained from processing the query and feature vectors from the database 705 to output search results in at least one of the two modalities. In an embodiment, an input modality can be associated with its corresponding output modality in the search results, where the input and output modalities differ or include one or more of the same modalities on either end (input or output, depending upon the implementation and corresponding system configuration to that end as readily appreciated given the teachings provided herein).

At block 1140, perform an action responsive to the search results.

Exemplary actions can include, for example, but are not limited to, recognizing anomalies in computer processing systems/power systems and controlling the system in which an anomaly is detected. For example, a query in the form of time series data from a hardware sensor or sensor network (e.g., mesh) can be characterized as anomalous behavior (dangerous or otherwise too high operating speed (e.g., motor, gear junction), dangerous or otherwise excessive operating heat (e.g., motor, gear junction), dangerous or otherwise out of tolerance alignment (e.g., motor, gear junction, etc.) using a text message as a label. In a processing pipeline, an initial input time series can be processed into multiple text messages and then recombined to include a subset of the text messages for a more focused resultant output time series with respect to a given topic (e.g., anomaly type). Accordingly, a device may be turned off, its operating speed reduced, an alignment (e.g., hardware-based) procedure is performed, and so forth, based on the implementation.

Another exemplary action can be operating parameter tracing where a history of the parameters change over time can be logged as used to perform other functions such as hardware machine control functions including turning on or off, slowing down, speeding up, positionally adjusting, and so forth upon the detection of a given operation state equated to a given output time series and/or text comment relative to historical data.

In the test phase, with the encoders 710 and 715 and the database 705 of raw data and features of both modalities available, nearest-neighbor search can be used to retrieve relevant data for unseen queries. The specific procedure for each of the three application scenarios are described below.

Figure 12:
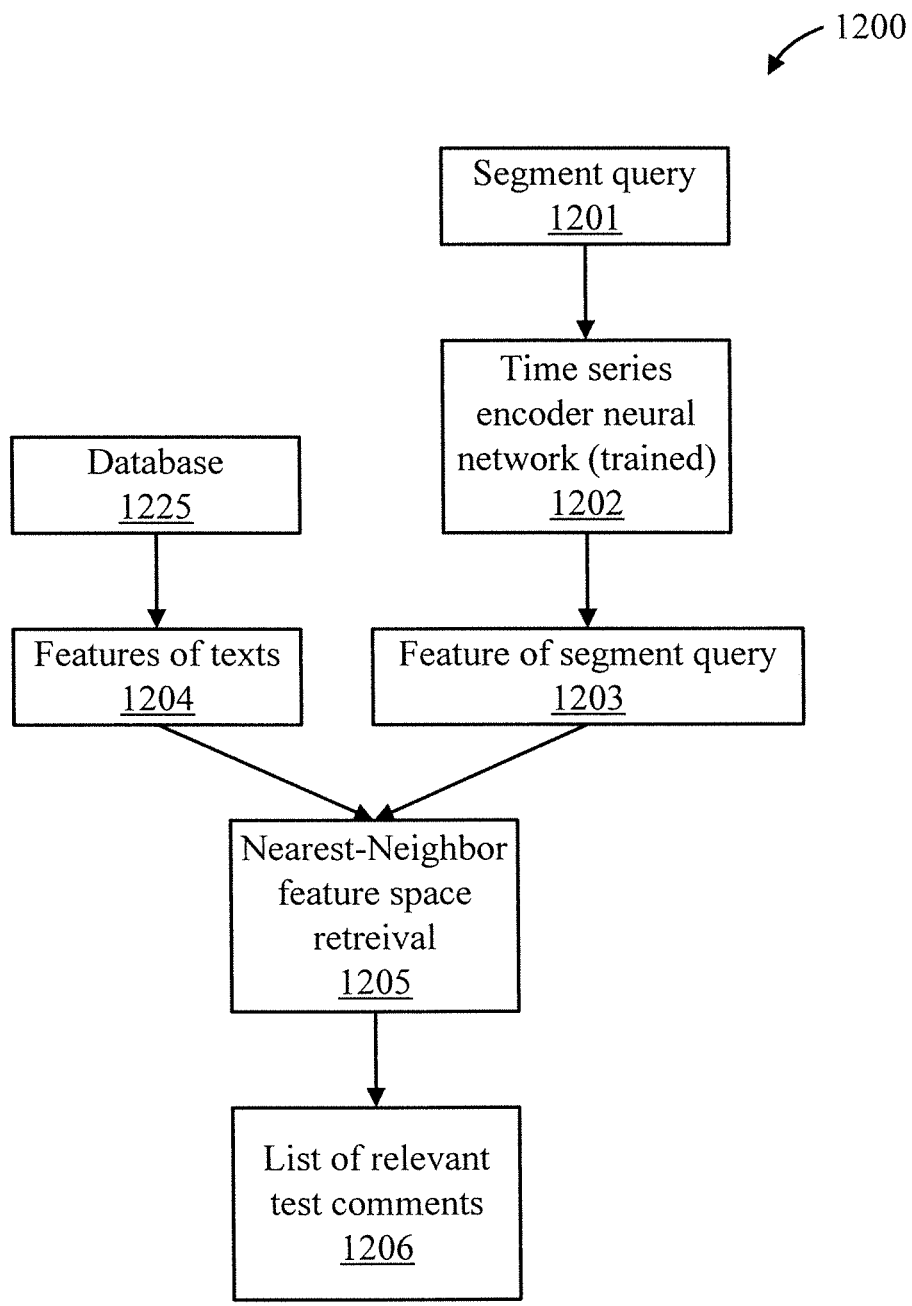
FIG. 12 is a high level block diagram showing an exemplary system/method for providing an explanation of an input time series, in accordance with an embodiment of the present invention.

FIG. 12 is a high level block diagram showing an exemplary system/method 1200 for providing an explanation of an input time series, in accordance with an embodiment of the present invention.

Given the query 1201 as a time series of arbitrary length, it is forward-passed through the time-series encoder 1202 to obtain a feature vector x 1203. Then from the database 1225, find the k text instances whose features 1204 have the smallest (Euclidean) distance to this vector (nearest neighbors 1205). These text instances, which are human-written free-form comments, are returned as retrieval results 1206.

Figure 13:
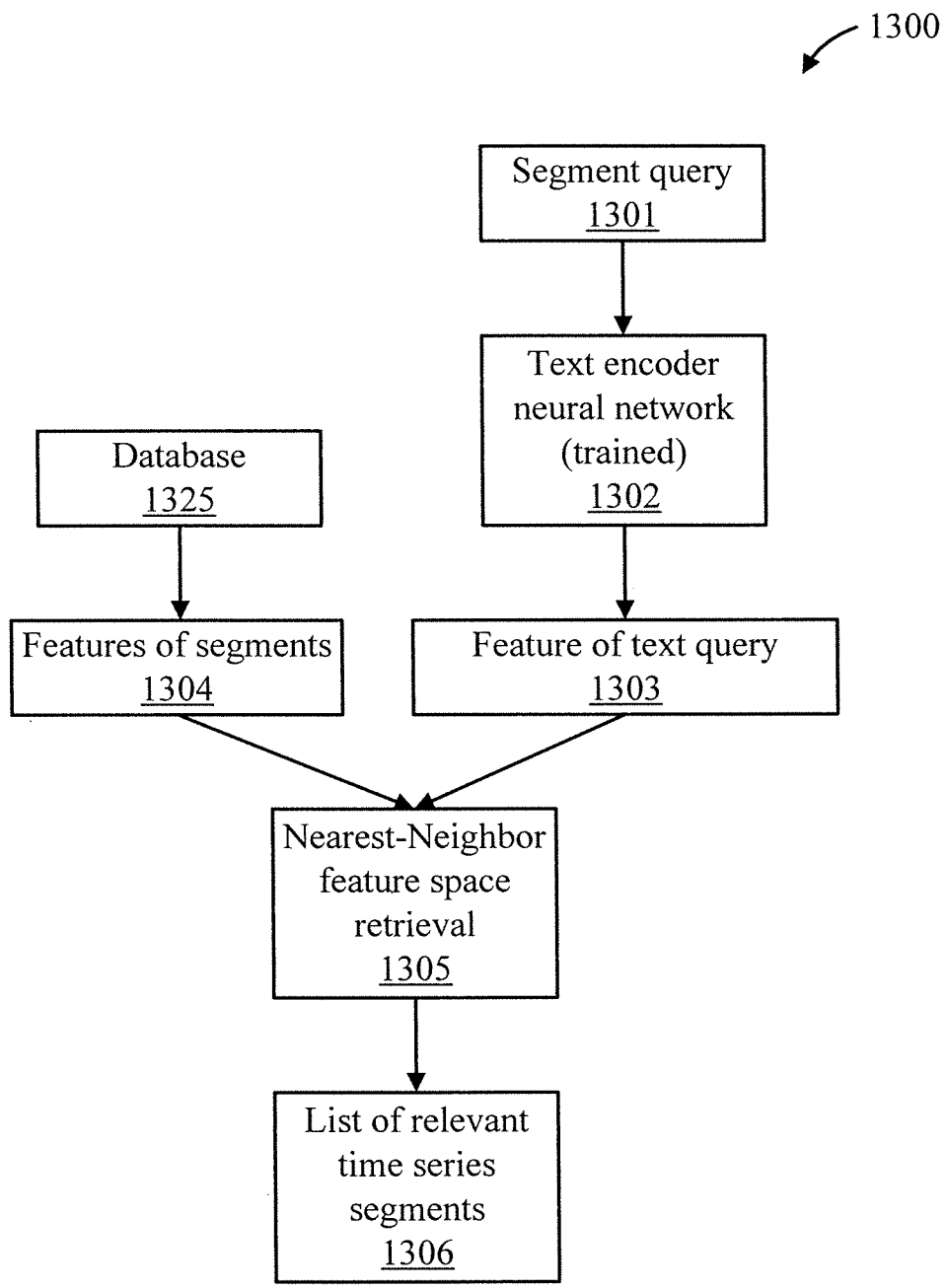
FIG. 13 is a high level block diagram showing an exemplary system/method for retrieving time series based on natural language input, in accordance with an embodiment of the present invention.

FIG. 13 is a high level block diagram showing an exemplary system/method 1300 for retrieving time series based on natural language input, in accordance with an embodiment of the present invention.

Given the query 1301 as a free-form text passage (i.e. words or short sentences), it is passed through the text encoder 1302 to obtain a feature vector y 1303. Then from the database 1325, find the k time-series instances whose features 1304 have the smallest distance to y (nearest neighbors 1305). These time series, which have the same semantic class as the query text and therefore have high relevance to the query, are returned as retrieval results 1306.

Figure 14:
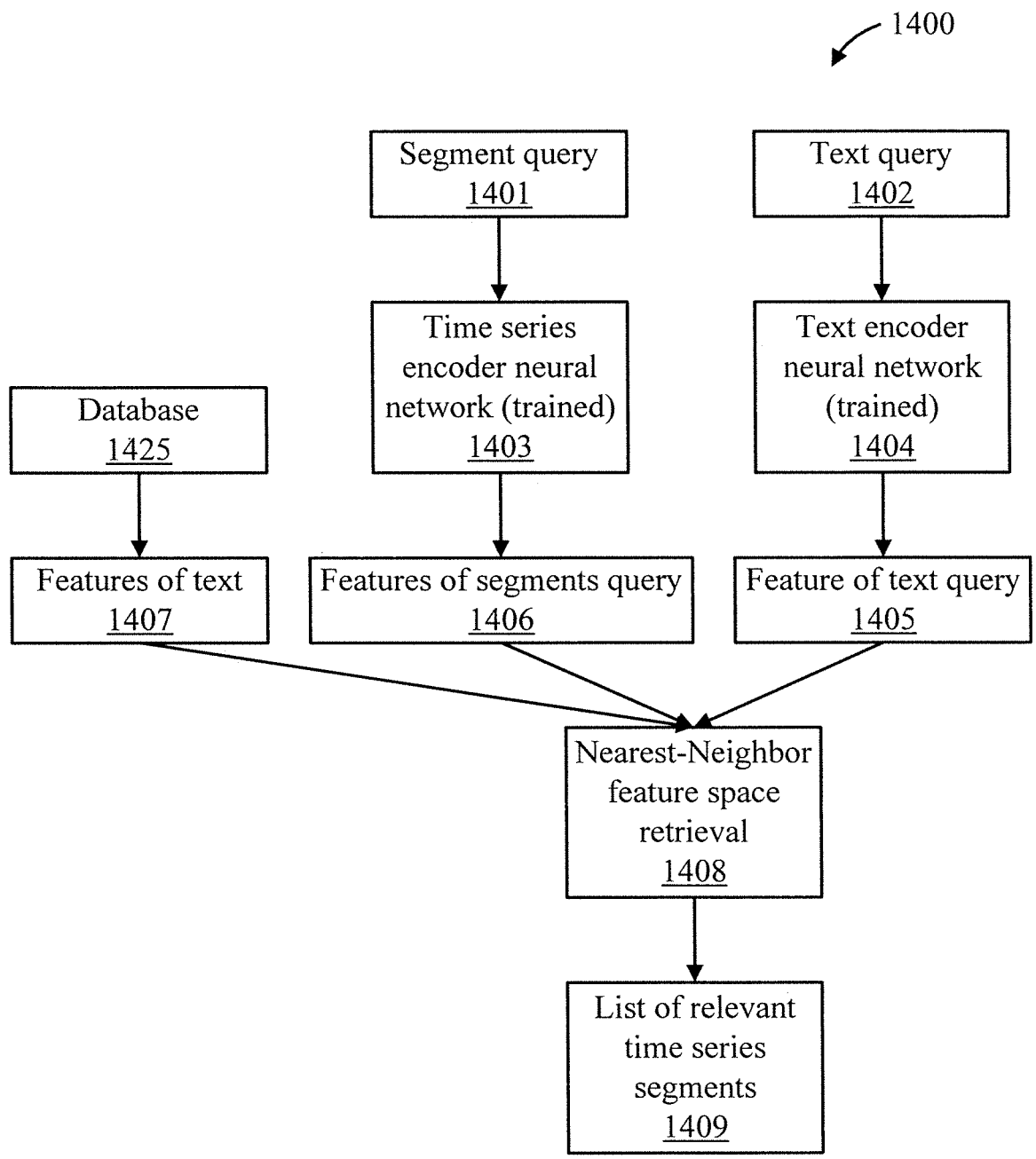
FIG. 14 is a high level block diagram showing an exemplary system/method for joint-modality search, in accordance with an embodiment of the present invention.

FIG. 14 is a high level block diagram showing an exemplary system/method 1400 for joint-modality search, in accordance with an embodiment of the present invention.

Given the query as a pair of (time series segment 1401, text description 1402), the time series is passed through the time-series encoder 1403 to obtain a feature vector x 1405, and the text description is passed through the text encoder 1404 to obtain a feature vector y 1406. Then from the database 1425, find the n time series segments whose features 1407 are the nearest neighbors 1408 of x and n time series segments whose features are the nearest neighbors 1408 of y, and obtain their intersection. Start from n=k. If the number of instances in the intersection is smaller than k, increment n and repeat the search, until at least k instances are retrieved. These instances, semantically similar to both the query time series and the query text, are returned as retrieval results 1409.

Besides the example application of power plant operation relating to FIG. 2 and the broader domain of industrial monitoring, various embodiments of the present invention can be used in many other settings, including but not limited to the following.

Intelligent fitness or sports coaching: retrieval between wearable sensor data collected from golfers, runners or swimmers and coach comments.

Healthcare: retrieval between remote patient monitoring sensor data and doctor/nurse notes.

Finance: retrieval between financial chart patterns and trade strategy notes.

The preceding examples are merely illustrative as readily appreciated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer processing system for cross-modal data retrieval, comprising:
a neural network having a time series encoder and text encoder which are jointly trained using an unsupervised training method which is based on a loss function, the loss function jointly evaluating a similarity of feature vectors of training sets of two different modalities of time series and free-form text comments and a compatibility of the time series and the free-form text comments with a word-overlap-based spectral clustering method configured to compute pseudo labels for the unsupervised training method;
a database for storing the training sets with feature vectors extracted from encodings of the training sets, the encodings obtained by encoding a training set of the time series using the time series encoder and encoding a training set of the free-form text comments using the text encoder; and
a hardware processor for retrieving the feature vectors corresponding to at least one of the two different modalities from the database for insertion into a feature space together with at least one feature vector corresponding to a testing input relating to at least one of a testing time series and a testing free-form text comment, determining a set of nearest neighbors from among the feature vectors in the feature space based on distance criteria, and outputting testing results for the testing input based on the set of nearest neighbors.

2. The computer processing system of claim 1, wherein the word-overlap-based spectral clustering method calculates a similarity value based on an amount of word overlap existing between two inputs of the free-form text comments.

3. The computer processing system of claim 2, wherein the hardware processor computes an affinity matrix based on the similarity value, and wherein the affinity matrix is used by the word-overlap-based spectral clustering method to generate cluster assignments of various inputs comprising the free-form text comments.

4. The computer processing system of claim 3, wherein the amount of word overlap is computed as an intersection of two sets of free-form text comments.

5. The computer processing system of claim 1, wherein cluster assignments made by the word-overlap-based spectral clustering method are configured as pseudo-labels.

6. The computer processing system of claim 5, wherein the cluster assignments are embodied in a cluster assignment matrix, wherein a given row in the cluster assignment matrix is a one-hot vector having a value of one only at a position that corresponds to a respective one of cluster assignments from the database that a given free-form text comment is assigned to.

7. The computer processing system of claim 1, wherein the loss function comprises a cosine embedding loss for an input pair selected from any of the time series and the free-form text comments, a clustering loss for the free-form text comments, and a clustering loss for the time series.

8. The computer processing system of claim 7, wherein the clustering losses are based on a Gaussian kernel.

9. The computer processing system of claim 1, where the testing input is an input time series of arbitrary length applied to the time series encoder to obtain the testing results as an explanation of the input time series in a form of one or more free-form text comments.

10. The computer processing system of claim 1, wherein the testing input is an input free-form text comment of arbitrary length applied to the text encoder to obtain the testing results as one or more time series having a same semantic class as the input free-form text comment.

11. The computer processing system of claim 1, wherein the testing input comprise both an input time series of arbitrary length applied to the time series encoder to obtain a first vector for the insertion into the feature space and an input free-form text comment of arbitrary length applied to the text encoder to obtain a second vector for the insertion into the feature space.

12. The computer processing system of claim 1, wherein multiple convolutional layers of the neural network capture local contexts and a transformed network of the neural network captures long term context dependencies relative to the local contexts.

13. The computer processing system of claim 1, wherein the testing input comprises a given time series data at least one hardware sensor for anomaly detection of a hardware system.

14. The computer processing system of claim 13, wherein the hardware processor controls the hardware system responsive to testing results.

15. A computer-implemented method for cross-modal data retrieval, comprising:
jointly training a neural network having a time series encoder and text encoder using an unsupervised training method which is based on a loss function, the loss function jointly evaluating a similarity of feature vectors of training sets of two different modalities of time series and free-form text comments and a compatibility of the time series and the free-form text comments with a word-overlap-based spectral clustering method configured to compute pseudo labels for the unsupervised training method;

storing, in a database, the training sets with feature vectors extracted from encodings of the training sets, the encodings obtained by encoding a training set of the time series using the time series encoder and encoding a training set of the free-form text comments using the text encoder;

retrieving the feature vectors corresponding to at least one of the two different modalities from the database for insertion into a feature space together with at least one feature vector corresponding to a testing input relating to at least one of a testing time series and a testing free-form text comment; and determining a set of nearest neighbors from among the feature vectors in the feature space based on distance criteria, and outputting testing results for the testing input based on the set of nearest neighbors.

16. The computer-implemented method of claim 15, wherein the word-overlap-based spectral clustering method calculates a similarity value based on an amount of word overlap existing between two inputs of the free-form text comments.

17. The computer-implemented method of claim 16, wherein an affinity matrix is computed based on the similarity value, and wherein the affinity matrix is used by the word-overlap-based spectral clustering method to generate cluster assignments of various inputs comprising the free-form text comments.

18. The computer-implemented method of claim 17, wherein the amount of word overlap is computed as an intersection of two sets of free-form text comments.

19. The computer-implemented method of claim 15, wherein cluster assignments made by the word-overlap-based spectral clustering method are configured as pseudo-labels.

20. A computer program product for cross-modal data retrieval, the computer program product comprising a non-transitory computer readable storage medium having program instructions embodied therewith, the program instructions executable by a computer to cause the computer to perform a method comprising:

jointly training a neural network having a time series encoder and text encoder using an unsupervised training method which is based on a loss function, the loss function jointly evaluating a similarity of feature vectors of training sets of two different modalities of time series and free-form text comments and a compatibility of the time series and the free-form text comments with a word-overlap-based spectral clustering method configured to compute pseudo labels for the unsupervised training method;

storing, in a database, the training sets with feature vectors extracted from encodings of the training sets, the encodings obtained by encoding a training set of the time series using the time series encoder and encoding a training set of the free-form text comments using the text encoder;

retrieving the feature vectors corresponding to at least one of the two different modalities from the database for insertion into a feature space together with at least one feature vector corresponding to a testing input relating to at least one of a testing time series and a testing free-form text comment; and determining a set of nearest neighbors from among the feature vectors in the feature space based on distance criteria, and outputting testing results for the testing input based on the set of nearest neighbors.

* * * * *